United States Patent
Matsubara

[11] 3,804,493
[45] Apr. 16, 1974

[54] ACCURATE LENS SYSTEMS FOR PRODUCING AN EXTREMELY SMALL IMAGE IN A REDUCED SCALE

[75] Inventor: Masaki Matsubara, Tokyo, Japan

[73] Assignee: Olympus Optical Company Limited, Tokyo, Japan

[22] Filed: Apr. 6, 1972

[21] Appl. No.: 241,527

[52] U.S. Cl................................. 350/214, 350/215
[51] Int. Cl......................... G02b 9/62, G02b 9/64
[58] Field of Search............................ 350/214, 215

[56] References Cited
UNITED STATES PATENTS

| | | | |
|---|---|---|---|
| 3,472,576 | 10/1969 | Wagner............................ | 350/214 X |
| 2,846,923 | 8/1958 | Tronnier............................ | 350/214 |
| 3,540,800 | 11/1970 | Tibbetts et al....................... | 350/214 |

Primary Examiner—John K. Corbin
Attorney, Agent, or Firm—Eric H. Waters

[57] ABSTRACT

An accurate lens system for producing an extremely small image in a reduced scale, which is constructed as two groups of lens systems located in front of and at the rear of an iris, respectively, the front group of lens system consisting of two or three lens components including one or two composite lenses and the rear group of lens system consisting of a first lens component of negative meniscus lens, second and third lens components of positive meniscus lenses, and a fourth lens component of positive meniscus lens or positive lens, and which is defined by the following five conditions, i.e.

I. $0.9f < f_P < 1.2f$,
II. $0.35f < |f_B| < 0.75f$, $f_B < 0$,
III. $0.17f < |R_B| < 0.23f$, $R_B < 0$,
IV. $|R_C| < |R_D|$, $R_C < 0$, $R_D < 0$, and
V. $0.9 (|R_A|+|R_B|)/2 < l_S < 1.4 (|R_A|+|R_B|)/2$ where $f$ is a composite focal length of the total lens system, $f_p$ is a composite focal length of the front group of lens system, $f_B$ is a focal length of the first lens component of the rear group of lens system, $R_B$ is a radius of curvature of the lens surface of the first lens component facing the iris of the rear group of lens system, $R_C$ is a radius of curvature of the lens surface of the first lens component facing the image of the rear group of lens system, $R_D$ is a radius of curvature of the lens surface of the second lens component facing the iris of the rear group of lens system, $R_A$ is a radius of curvature of the lens surface of the lens facing the iris and which is the nearest to the iris of the front group of lens system, and $l_S$ is an air space between the front group of lens system and the rear group of lens system.

4 Claims, 21 Drawing Figures

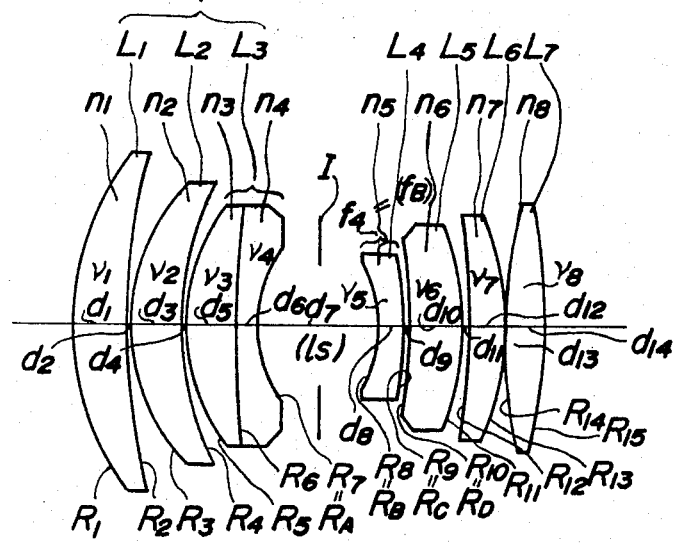
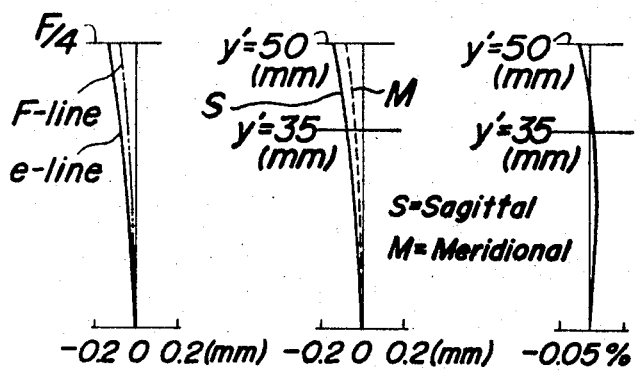
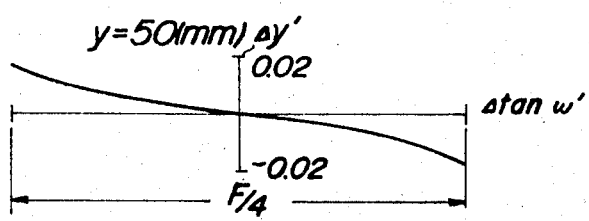
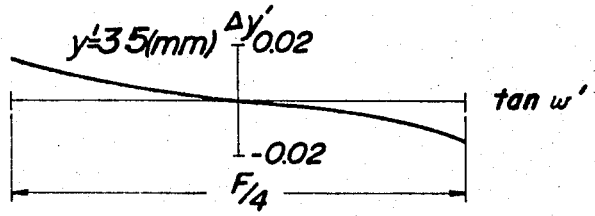

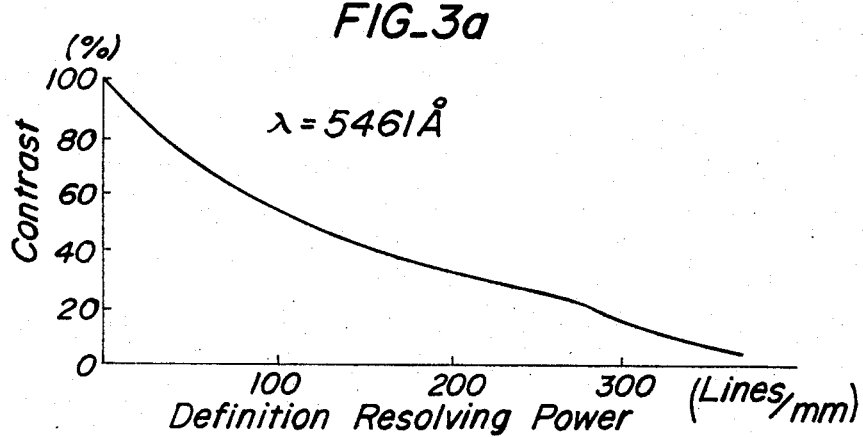
FIG_3a
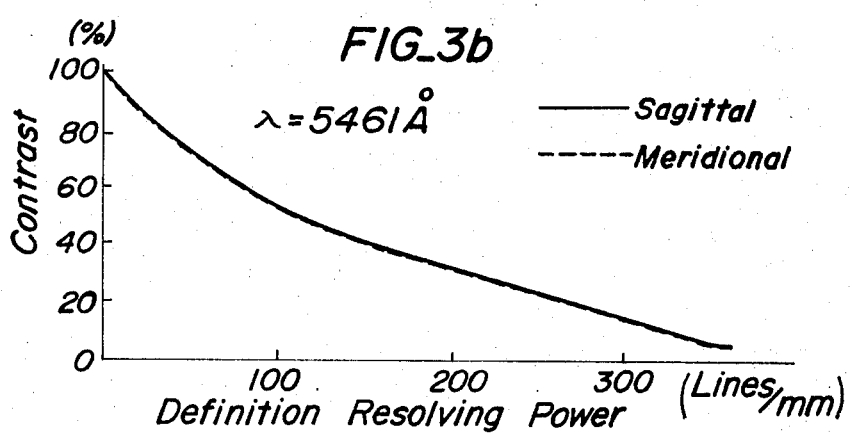
FIG_3b
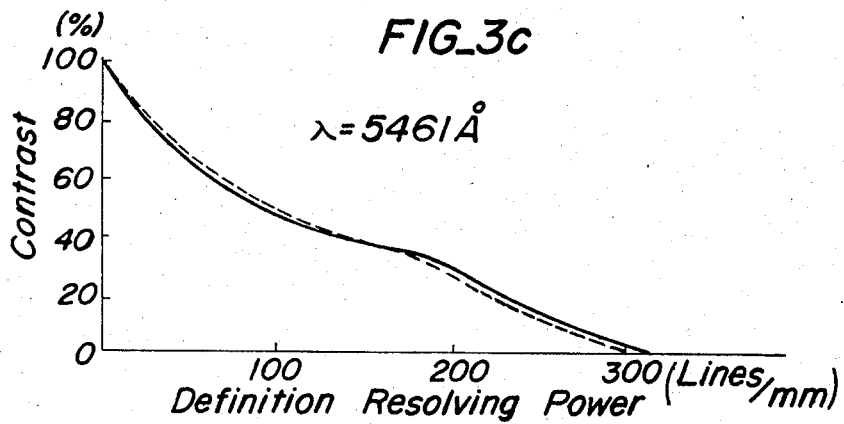
FIG_3c

FIG_4
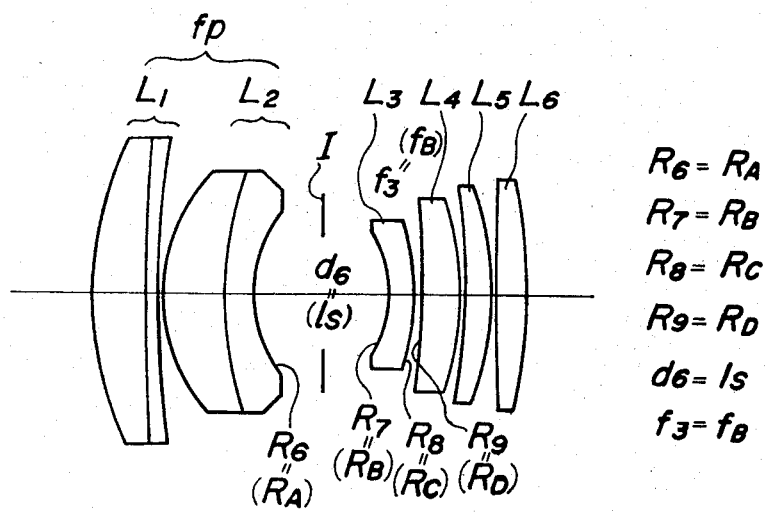
FIG_5a  FIG_5b  FIG_5c
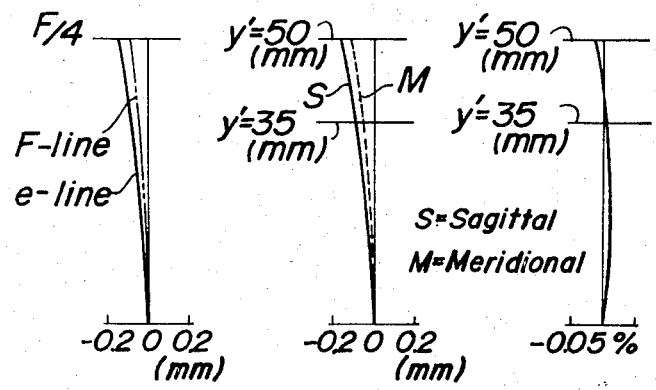
FIG_5d
FIG_5e
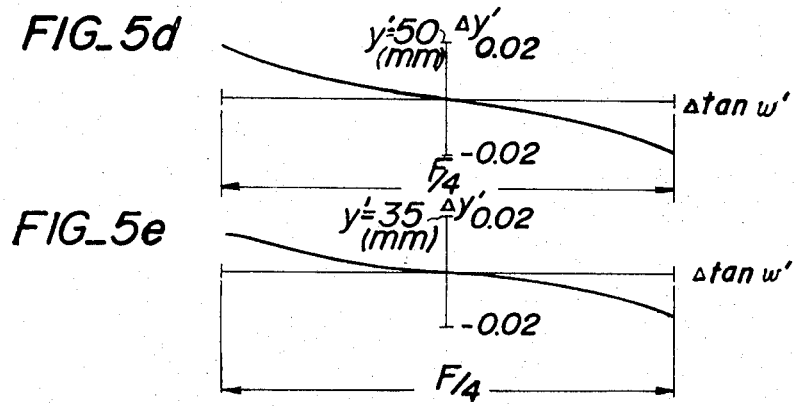

FIG.6
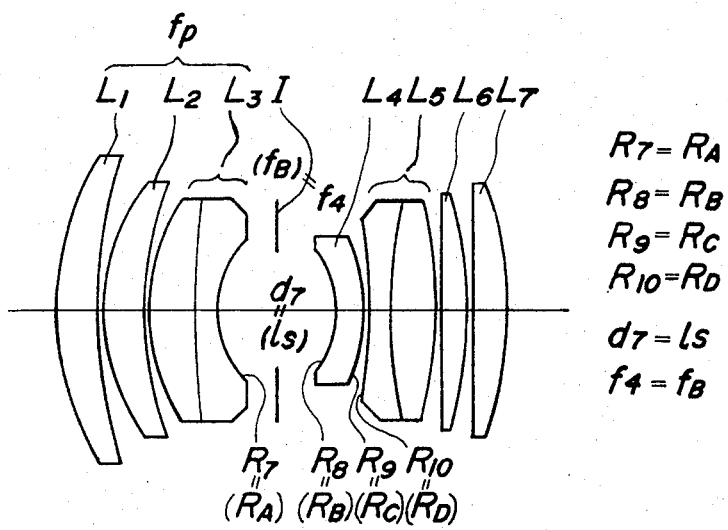
$R_7 = R_A$
$R_8 = R_B$
$R_9 = R_C$
$R_{10} = R_D$
$d_7 = l_s$
$f_4 = f_B$
FIG.7a  FIG.7b  FIG.7c
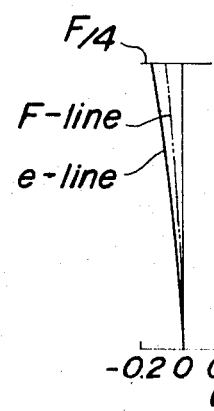 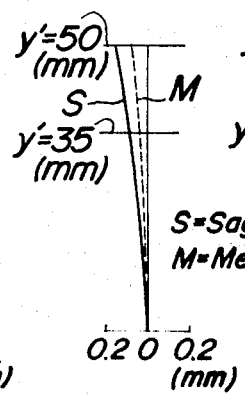 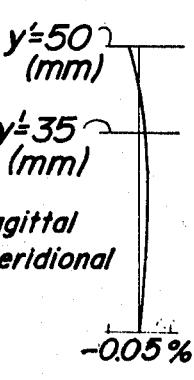
FIG.7d  FIG.7e
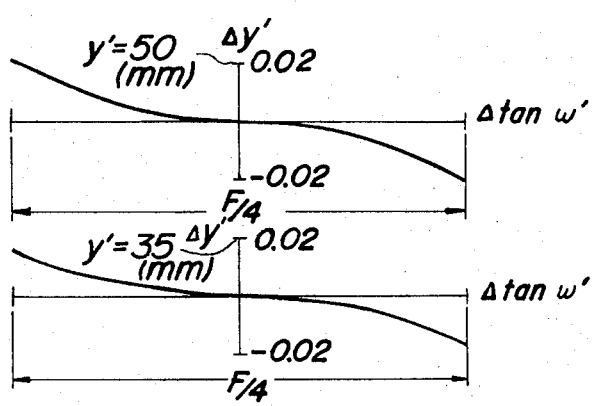

ACCURATE LENS SYSTEMS FOR PRODUCING AN EXTREMELY SMALL IMAGE IN A REDUCED SCALE

This invention relates to accurate lens systems for producing an extremely small image in a reduced scale.

As one of the steps of manufacturing a semiconductor integral circuit, for example, there is a step of producing the image of an extremely small pattern in a reduced scale onto the surface of a semiconductor.

Such kind of lens system for producing an extremely small image in a reduced scale must have a high definition resolving power which is uniform throughout the picture surface used and must produce a flat picture surface without producing a vignetting and distortion. Many attempts have been made to provide such kind of lens system which has a wide picture surface and a high definition resolving power up to the edges of the picture surface, but hitherto none has led to fully satisfactory results. Hence, such kind of lens system has eagerly been desired.

The object of the invention, by adopting suitable dimensions for successive lens components and suitable combination and arrangement thereof, is to obtain a high definition resolving power from the center up to the edges of the picture surface of the image.

Another object of the invention is to provide an accurate lens system for producing an extremely small image in a reduced scale that has a high definition resolving power of the order of more than 300 lines/mm at the effective picture surface of 100 mm$\phi$ in which $f=183$ mm, magnification of 1/20X, and aperture ratio of F/40.

A feature of the invention is the provision of a lens system constructed as two groups of lens systems located in front of and at the rear of an iris, respectively, the front group of lens system consisting of two or three lens components including one or two composite lenses and the rear lens component of lens system consisting of a first group of negative meniscus lens, second and third lens components of positive meniscus lenses, and a fourth lens component of positive meniscus lens or positive lens, and which is defined by the following five conditions, i.e.

I. $0.9f < f_P < 1.2f$,
II. $0.35f < |f_B| < 0.75f, f_B < 0$,
III. $0.17f < |R_B| < 0.23f, R_B < 0$,
IV. $|R_C| < |R_D|, |R_C| < 0, R_D < 0$, and
V. $0.9(|R_A|+|R_B|)/2 < l_S < 1.4(|R_A|+|R_B|)/2$ where $f$ is a composite focal length of the total lens system, $f_P$ is a composite focal length of the front group of lens system, $f_B$ is a focal length of the first lens component of the rear group of lens system, $R_B$ is a radius of curvature of the lens surface of the first lens component facing the iris of the rear group of lens system, $R_C$ is a radius of curvature of the lens surface of the first lens component facing the image of the rear group of lens system, $R_D$ is a radius of curvature of the lens surface of the second lens component facing the iris of the rear group of lens system, $R_A$ is a radius of curvature of the lens surface of the lens facing the iris and which is the nearest to the iris of the front group of lens system, and $l_S$ is an air space between the front group of lens system and the rear group of lens system.

For a better understanding of the invention, the same will be explained by reference to the accompanying drawings, in which:

FIG. 1 shows in cross-section an embodiment of the invention;

FIGS. 2a – 2e show aberration characteristic curves of the embodiment shown in FIG. 1;

FIGS. 3a – 3c show response function curves illustrating a high definition resolving power of the embodiment shown in FIG. 1;

FIG. 4 shows in cross-section another embodiment of the invention;

FIGS. 5a – 5e show aberration characteristic curves of the embodiment shown in FIG. 4;

FIG. 6 shows in cross-section a further embodiment of the invention; and

FIGS. 7a – 7e show aberration characteristic curves of the embodiment shown in FIG. 6.

Referring to the drawings, one embodiment constructed in accordance with the invention is shown in FIG. 1, in which $L_1$, $L_2$ and $L_3$ designate a front group of lens system located in front of an iris I and $L_4$, $L_5$, $L_6$ and $L_7$ show a rear group of lens system located at the rear of the iris I.

In such kind of lens systems, it has been the common practice to use monochromatic light for the purpose of avoiding the influence of the chromatic aberration and hence of obtaining the high definition resolving power.

The present invention makes use as a standard wave length of e-line (having a wave length of 546.1 m$\mu$), which has been generalized in recent years in the lens systems for producing an extremely small image in a reduced scale and effects correction of the chromatic aberration in certain degree for the light ray whose wave length is close by that of the e-line.

In accordance with the invention the lens system is constructed as two groups of lens systems and one of these two groups of lens systems $L_1$, $L_2$ and $L_3$ is located in front of the iris I, while the other group of lens system $L_4$, $L_5$, $L_6$ and $L_7$ is located at the rear of the iris I. The front group of lens system consists of two or three lens components including one or two composite lenses. In the embodiment shown in FIG. 1, the front group of lens system consists of three lens components $L_1$, $L_2$ and $L_3$ of which the lens $L_3$ is a composite lens. The rear group of lens system consists of a first lens component of negative meniscus lens $L_4$, second and third lens components of positive meniscus lenses $L_5$ and $L_6$, respectively, and a fourth lens component of positive meniscus lens or positive lens. In the embodiment shown in FIG. 1, the fourth lens component consists of a positive meniscus lens $L_7$. The total lens system is defined by the following five conditions, i.e.

I. $0.9f < f_P < 1.2f$,
II. $0.35f < |f_B| < 0.75f, f_B < 0$,
III. $0.17f < |R_B| < 0.23f, R_B < 0$,
IV. $|R_C| < |R_D|, R_C < 0, R_D < 0$, and
V. $0.9(|R_A|+|R_B|)/2 < l_S < 1.4(|R_A|+|R_B|)/2$ where $f$ is a composite focal length of the total lens system, $f_P$ is a composite focal length of the front group of lens system, $f_B$ is a focal length $f_4$ of the first lens component $L_4$ of the rear group of lens system, $R_B$ is a radius of curvature of the lens surface facing the iris I of the first lens component $L_4$ of the rear group of lens system, $R_C$ is a radius of curvature of the lens surface of the first lens component $L_4$ facing the image of the rear group of lens system, $R_D$ is a radius of curvature $R_{10}$ of the lens surface of the second lens component $L_5$ facing the iris I of the rear group of lens system, $R_A$ is a radius of curvature $R_7$ of the lens surface of the lens $L_3$ facing the iris I and which is the nearest to the iris I of the front group of lens system, and $l_S$ is an air space $d_7$ between the front group of lens system $L_1$, $L_2$, $L_3$ and the rear group of lens system $L_4$, $L_5$, $L_6$, $L_7$.

In order to make the definition resolving power up to the edges of the picture surface of the image higher than 300 lines/mm, it is necessary to eliminate a reduction in intensity of illumination of the edges of the image, i.e., eliminate vignetting and at the same time to considerably decrease the aberration at the edges of the picture surface of the image.

Thus, in accordance with the invention the convex lens facing the object of the front group of lens system of the conventional gauss type lens system constructed as four components and six lenses is divided into two components of convex lenses and the composite lens of the rear group of lens system is decomposed and the convex lens at the image side is divided into two components of convex lenses, resulting in seven components in total. Moreover, each lens component is made of a material having a relatively high refractive index to decrease the amount of correction required for each lens, thereby significantly reducing various aberrations. It is preferable that the rear group of lens system consists of four lens components and which corrects the sagittal coma and distortion which cause the definition resolving power at the edges of the picture surface of the image to decrease.

The condition I) relates to a refractive power distribution of the total lens system. The condition I) makes it possible to distribute the refractive power of the total lens system in a manner such that the front or rear group of lens system is not required to excessively correct the aberrations thus resulting in a balanced state of correction of the aberrations in the total lens system. If $f_P$ becomes increased beyond the upper limit of $1.2f$ or becomes decreased smaller than the lower limit of $0.9f$, the front or rear group of lens system is required to effect the surplus correction of the aberrations giving rise to excessive amount of residual aberrations so that the absolute amount of the aberrations to be corrected is increased, with the result that the lens system could not be used as one having a high definition resolving power.

The conditions II, III and IV relate to the sagittal image surface. The wide picture surface of the image as is produced by the lens system according to the invention intensely increases the curvature and coma on the sagittal image surface whereby the definition resolving power is reduced. Thus, it is important to provide means enabling a suppression of the curvature and coma on the sagittal image surface to be obtained. In accordance with the invention use is made of the third or fourth lens components $L_3$ or $L_4$ having a relatibely strong refractive power $f_B$ as given by the condition II and having $R_B$ as given by the condition III. As a result of this, said curvature and coma on the sagittal image surface can reliably be corrected. If $f_B$ and $R_B$ become increased beyond the upper limits of the conditions II and III, the refractive power is reduced and the curvature on the sagittal image surface is increased to such an extent that correction thereof could not be attained.

If $f_B$ and $R_B$ become decreased below the lower limits of the conditions II and III, the coma on the sagittal image surface becomes so intense that the definition resolving power at the edges of the sagittal image surface is reduced. The aberration with respect to the sagittal light beam becomes unsymmetrical in a direction perpendicular to the section of the sagittal image surface. This aberration is caused to be increased if the condition IV is not satisfied, thereby rendering the correction of the aberrations by means of the other lens surfaces difficult. The condition IV is also associated with the distortion. In the embodiment shown in FIG. 1, the negative distortion produced by $R_9(R_C)$ or by the front group of lens system is corrected by $R_{10}(R_D)$, $R_{12}$ and $R_{14}$. The condition IV is particularly useful for correcting the distortion strongly produced by $R_9(R_C)$ with the aid of $R_{10}(R_D)$.

The condition V is capable of minutely correcting the meridional coma and astigmatism. If $l_S$ is given by the condition V, a suppression of coma flare and a good balanced state of astigmatism are attained.

The invention will now be described with reference to embodiments of which the results are obtained by effecting corrections under the above mentioned five conditions I – V.

EXAMPLE 1

In the present embodiment, the lens system is constructed as seven components and eight lenses as shown in FIG. 1. The first lens component of positive meniscus lens $L_1$, second lens component of positive meniscus lens $L_2$, third lens component of composite negative meniscus lens $L_3$, iris I, fourth lens component of negative meniscus lens $L_4$, fifth lens component of positive meniscus lens $L_5$, sixth lens component of positive meniscus lens $L_6$, and seventh lens component of positive meniscus lens $L_7$ are arranged in succession from an object (not shown). The first, second and third lens components $L_1$, $L_2$ and $L_3$ constitute the front group of lens system, while the fourth, fifth, sixth, and seventh lens components $L_4$, $L_5$, $L_6$ and $L_7$ constitute the rear groups of lens system.

In the present embodiment, $f=183$ mm, $f_P=198.73$ mm, $f_B=-90.56$ mm, the aperture ratio is F/4, the magnification is 1/20X, the dimension of the picture surface is 100 $mm\phi$, and the definition resolving power is 300 lines/$mm$ throughout the picture surface of 100 $mm\phi$. The position of the object is 3,625.0 $mm$ from the front face of the lens system and the position of the image is 60.5 mm from the rear face of the lens system.

In the following Table, $n_1, n_2, \ldots n_8$ are refractive indexes for the $e$-line of the successive lenses counted from the object side and $\nu_1, \nu_2, \ldots \nu_8$ are Abbe's numbers for the $d$-line.

| | | | |
|---|---|---|---|
| $R_1= 103.48$ | | | |
| | $d_1=18.2$ | $n_1=1.69978$ | $\nu_1=55.62$ |
| $R_2= 251.28$ | | | |
| | $d_2= 0.8$ | | |
| $R_3= 71.41$ | | | |
| | $d_3=18.2$ | $n_2=1.69978$ | $\nu_2=55.62$ |
| $R_4= 121.60$ | | | |
| | $d_4= 0.8$ | | |
| $R_5= 82.29$ | | | |
| | $d_5=18.2$ | $n_3=1.69978$ | $\nu_3=55.62$ |
| $R_6= 785.20$ | | | |
| | $d_6= 7.5$ | $n_4=1.74618$ | $\nu_4=28.29$ |
| $R_7= 39.39$ | | | |
| | $d_7=43.18$ | | |
| $R_8= -38.48$ | | | |
| | $d_8=10.0$ | $n_5=1.80922$ | $\nu_5=39.57$ |

$R_9 = -90.40$
$R_{10} = -265.79$
$R_{11} = -109.94$
$R_{12} = -310.99$
$R_{13} = -104.46$
$R_{14} = 386.94$
$R_{15} = -198.77$ $d_9 = 0.8$
$d_{10} = 20.0$ $n_6 = 1.71615$ $\nu_6 = 53.98$
$d_{11} = 1.0$
$d_{12} = 13.8$ $n_7 = 1.71615$ $\nu_7 = 53.98$
$d_{13} = 1.0$
$d_{14} = 13.8$ $n_8 = 1.71615$ $\nu_8 = 53.98$

The Seidel's coefficients of the lens system of the present embodiment are listed by Berek's expressions in the following Table.

|   | A$\nu$ | B$\nu$ | Γ$\nu$ | P$\nu$ | □$\nu$ |
|---|---|---|---|---|---|
| 1 | 1.4887 | 0.1089 | −0.4026 | 0.7632 | −0.2358 |
| 2 | 0.0004 | 0.3580 | −0.00113 | −0.3143 | −1.3886 |
| 3 | 0.2733 | 0.0026 | −0.0268 | 1.1061 | −0.1088 |
| 4 | 0.0723 | 1.3593 | −0.3136 | −0.6495 | −3.0767 |
| 5 | −0.0165 | −0.6439 | −0.1032 | 0.9598 | 1.9708 |
| 6 | −0.1840 | −0.2731 | 0.2242 | 0.0038 | 0.3280 |
| 7 | −0.1017 | −0.0358 | −0.0604 | −2.0812 | −1.2569 |
| 8 | −2.2453 | −0.3483 | 0.8843 | −2.2301 | 1.0155 |
| 9 | 0.0625 | 0.3419 | −0.1461 | 0.9493 | −3.0211 |
| 10 | −0.0050 | −0.2573 | 0.0359 | −0.3012 | 3.9976 |
| 11 | 0.1364 | 0.2327 | −0.1782 | 0.7282 | −1.2554 |
| 12 | −0.0345 | −0.3714 | 0.1132 | −0.2574 | 2.0627 |
| 13 | 0.3540 | 0.0344 | −0.1104 | 0.7664 | −0.2496 |
| 14 | −0.0323 | −0.5166 | 0.1291 | 0.2069 | 1.2395 |
| 15 | 0.3943 | 0.0074 | −0.0541 | 0.4028 | −0.0563 |
| Σ | 0.1625 | −0.0011 | −0.0198 | 0.0527 | −0.0352 |

As seen from the above Table, the total sum Σ of each of the Seidel's coefficients is substantially zero which shows that the aberrations are significantly corrected.

Various aberration characteristic curves of the present embodiment are shown in FIGS. 2a – 2e. FIG. 2a shows the spherical aberration in which the full line shows the spherical aberration at the e-line, while the two dotts-dash lines show the spherical aberration at the F-line. FIG. 2b shows the astigmatisms in which the full line shows the sagittal astigmatism (S), while the dotted lines show the meridional astigmatism (M). FIG. 2c shows the distortion. FIGS. 2d and 2e show the meridional comas at y'=50 mm and y'=35 mm, respectively, y' being the height of the image.

The response functions on axis, at the picture surfaces of which the dimension is 70 $mm\phi$, and at the picture surface of which the dimension is 100 $mm\phi$ for the wave length λ=5,461 A are shown in FIGS. 3a, 3b and 3c, respectively. In FIGS. 3b and 3c, the full line shows the sagittal response function and dotted lines show the meridional response function.

As seen from the aberration characteristic curves shown in FIGS. 2a – 2e, the lens system according to the present embodiment makes it possible to significantly correct various aberrations. FIGS. 3a – 3c show that the lens system according to the present embodiment is capable of obtaining a high definition resolving power of the order of more than 300 lines/mm from the center (on axis) up to the edges of the picture surface of the image and hence is particularly useful as an accurate lens system for producing an extremely small image in a reduced scale.

EXAMPLE 2

In the present embodiment, the lens system is constructed as six components and eight lenses as shown in FIG. 4. That is, the front group of lens system consists of two components of composite lenses $L_1$ and $L_2$. In the pesent embodiment, $f$=185 mm, $f_F$=188.97 mm, $f_B$=−91.38 mm, the aperture ratio is F/4, the magnification is 1/20X, the dimension of the picture surface is 100 $mm\phi$, and the definition resolving power is 300 lines/mm throughout the picture surface of 100 $mm\phi$. The position of the object is 3,760 mm from the front face of the lens system and the position of the image is 66.0 mm from the rear face of the lens system.

In the following Table, $n_1, n_2, \ldots n_8$ are refractive indexes for the e-line of the successive lenses counted from the object side and $\nu_1, \nu_2, \ldots \nu_8$ are Abbe's numbers for the d-line.

$R_1 = 120.32$
$R_2 = -853.19$
$R_3 = 408.41$
$R_4 = 53.88$
$R_5 = 119.90$
$R_6 = 39.60$
$R_7 = -36.75$
$R_8 = -87.72$
$R_9 = -292.85$
$R_{10} = -95.96$
$R_{11} = -220.67$
$R_{12} = -97.82$
$R_{13} = \infty$
$R_{14} = -185.15$ $d_1 = 20.6$ $n_1 = 1.69978$ $\nu_1 = 55.62$
$d_2 = 5.2$ $n_2 = 1.70443$ $\nu_2 = 30.12$
$d_3 = 0.5$
$d_4 = 20.5$ $n_3 = 1.71615$ $\nu_3 = 53.98$
$d_5 = 10.3$ $n_4 = 1.70443$ $\nu_4 = 30.12$
$d_6 = 50.0$
$d_7 = 9.8$ $n_5 = 1.75454$ $\nu_5 = 35.19$
$d_8 = 0.5$
$d_9 = 14.0$ $n_6 = 1.69675$ $\nu_6 = 50.81$
$d_{10} = 0.5$
$d_{11} = 14.0$ $n_7 = 1.6966$ $\nu_7 = 53.34$
$d_{12} = 0.5$
$d_{13} = 14.0$ $n_8 = 1.69978$ $\nu_8 = 55.62$ The Seidel's coefficients of the lens system of the present embodiment are listed by Berek's expressions in the following Table.

|   | A$\nu$ | B$\nu$ | Γ$\nu$ | P$\nu$ | □$\nu$ |
|---|---|---|---|---|---|
| 1 | 1.0331 | 0.0045 | −0.0670 | 0.6662 | −0.0441 |
| 2 | −0.0040 | −0.0082 | 0.0058 | −0.0004 | 0.0123 |
| 3 | 0.0359 | 0.6053 | −0.1474 | −0.1970 | −1.6765 |
| 4 | 1.4923 | 0.0335 | 0.2234 | 1.5078 | −0.2308 |
| 5 | 0.0079 | 0.0267 | −0.0146 | −0.0065 | −0.0370 |
| 6 | −0.2793 | −0.0389 | −0.1042 | −2.0320 | −0.7725 |
| 7 | −3.2874 | −0.1747 | 0.7579 | −2.2782 | 0.5655 |
| 8 | 0.0951 | 0.3210 | −0.1747 | 0.9545 | −2.3440 |
| 9 | −0.0063 | −0.2583 | 0.0403 | −0.2730 | 3.4066 |
| 10 | 0.2950 | 0.2138 | −0.2512 | 0.8331 | −0.8912 |
| 11 | −0.0966 | −0.3809 | 0.1918 | −0.3623 | 1.4755 |
| 12 | 0.5537 | 0.0336 | −0.1363 | 0.8172 | 0.2092 |
| 13 | −0.1025 | −0.4195 | 0.2074 | 0 | 0.8488 |
| 14 | 0.4601 | 0.0330 | −0.1232 | 0.4329 | −0.1247 |
| Σ | 0.1970 | −0.0093 | −0.0396 | 0.0624 | −0.0214 |

As Seen from the above Table, the total sum Σ of each of the Seidel's coefficients is substantially zero which shows that the aberrations are significantly corrected.

Various aberration characteristic curves of the present embodiment are shown in FIGS. 5a – 5e. FIG. 5a shows the spherical aberration in which the full line shows the spherical aberration of the e-line, while the two dots-dash lines show the spherical aberration at the F-line. FIG. 5b shows the astigmatisms in which the full line shows the sagittal astigmatism (S), while the dotted lines show the meridional astigmatism (M). FIG. 5c shows the distortion. FIGS. 5d and 5e show the meridional comas at y'=50 mm and y'=35 mm, respectively, y' being the height of the image.

As seen from the aberration characteristic curves shown in FIGS. 5a – 5e, the lens system according to the present embodiment also makes it possible to significantly correct various aberrations.

EXAMPLE 3

In the present embodiment, the lens system is constructed as seven components and nine lenses as shown in FIG. 6 and use is made of a composite lens instead of the positive meniscus lens as the second lens component $L_5$ of the rear group of lens system shown in FIG. 1.

In the present embodiment, $f=180$ mm, $f_P=197.33$ mm, $f_B = -126.51$ mm, the aperture ratio is F/4, the magnification is 1/20X, the dimension of the picture surface is 100 $mm\phi$, and the definition resolving power is 300 lines/mm throughout the picture surface of 100 $mm\phi$. The position of the object is 3,621 $mm$ from the front face of the lens system and the position of the image is 68.6 $mm$ from the rear face of the lens system.

In the following Table, $n_1, n_2, \ldots n_9$ are refractive indexes for the e-line of the successive lenses counted from the object side and $\nu_1, \nu_2, \ldots \nu_9$ are Abbe's numbers for the d-line.

| | | | |
|---|---|---|---|
| $R_1=102.05$ | | | |
| | $d_1=13.8$ | $n_1=1.71615$ | $\nu_1=53.98$ |
| $R_2=180.27$ | | | |
| | $d_2=0.7$ | | |
| $R_3=70.37$ | | | |
| | $d_3=14.6$ | $n_2=1.69978$ | $\nu_2=55.62$ |
| $R_4=140.85$ | | | |
| | $d_4=0.7$ | | |
| $R_5=70.34$ | | | |
| | $d_5=17.5$ | $n_3=1.6966$ | $\nu_3=53.34$ |
| $R_6=333.68$ | | | |
| | $d_6=8.0$ | $n_4=1.73429$ | $\nu_4=28.46$ |
| $R_7=36.28$ | | | |
| | $d_7=42.06$ | | |
| $R_8=-38.79$ | | | |
| | $d_8=11.2$ | $n_5=1.74795$ | $\nu_5=44.78$ |
| $R_9=-73.86$ | | | |
| | $d_9=0.7$ | | |
| $R_{10}=-181.15$ | | | |
| | $d_{10}=6.8$ | $n_6=1.74795$ | $\nu_6=44.78$ |
| $R_{11}=159.36$ | | | |
| | $d_{11}=16.5$ | $n_7=1.6254$ | $\nu_7=57.06$ |
| $R_{12}=-129.29$ | | | |
| | $d_{12}=0.7$ | | |
| $R_{13}=\infty$ | | | |
| | $d_{13}=10.00$ | $n_8=1.71615$ | $\nu_8=53.98$ |
| $R_{14}=-142.28$ | | | |
| | $d_{14}=0.7$ | | |
| $R_{15}=\infty$ | | | |
| | $d_{15}=13.5$ | $n_9=1.71615$ | $\nu_9=53.98$ |
| $R_{16}=-124.67$ | | | |

The Seidel's coefficients of the lens system of the present embodiment are listed by Berek's expressions in the following Table.

| | A$\nu$ | B$\nu$ | $\Gamma\nu$ | P$\nu$ | $\nu$ |
|---|---|---|---|---|---|
| 1 | 1.4918 | 0.0333 | −0.2229 | 0.7669 | −0.1196 |
| 2 | 0.0193 | 0.0776 | 0.0387 | −0.4341 | −0.7152 |
| 3 | 0.7621 | 0.0052 | −0.0630 | 1.0972 | −0.0911 |
| 4 | 0.0965 | 1.2652 | −0.3494 | −0.5481 | −2.5965 |
| 5 | −0.1553 | −0.2654 | −0.2030 | 1.0946 | 1.0838 |
| 6 | −0.1432 | −0.1893 | 0.1647 | 0.0072 | 0.2094 |
| 7 | −0.3671 | −0.0677 | −0.1576 | −2.1883 | −0.9687 |
| 8 | −2.7040 | −0.3604 | 0.9872 | −2.0687 | 0.8868 |
| 9 | 0.2394 | 0.3435 | −0.2868 | 1.0864 | −1.7125 |
| 10 | −0.0409 | −0.3926 | 0.1268 | −0.4430 | 2.5879 |
| 11 | −0.0078 | −0.1178 | −0.0303 | −0.0508 | −0.6552 |
| 12 | 0.0761 | 0.2159 | −0.1282 | 0.5581 | −1.3038 |
| 13 | −0.0034 | −0.2926 | 0.0316 | 0 | 2.7056 |
| 14 | 0.2619 | 0.1201 | −0.1773 | 0.55 | −0.4538 |
| 15 | −0.0575 | −0.3921 | 0.1501 | 0 | 1.0237 |
| 16 | 0.6979 | 0.0131 | 0.0954 | 0.6277 | 0.0876 |
| Σ | 0.1656 | −0.0041 | −0.0240 | 0.0551 | −0.0315 |

As seen from the above Table, the total sum Σ of each of the Seidel's coefficients is substantially zero which shows that the aberrations are significantly corrected.

Various aberration characteristic curves of the present embodiment are shown in FIGS. 7a - 7e. FIG. 7a shows the spherical aberration in which the full line shows the spherical aberration at the e-line, while the two dots-dash lines show the spherical aberration at the F-line. FIG. 7b shows the astigmatisms in which the full line shows the sagittal astigmatism (S), while the dotted lines show the meridional astigmatism (M). FIG. 7c shows the distortion. FIGS. 7d and 7e show the meridional comas at $y'=50$ mm and $y'=35$ mm, respectively, $y'$ being the height of the image.

As seen from the aberration characteristuc curves shown in FIGS. 7a - 7e, the lens system according to the present embodiment makes it possible to significantly correct various aberrations.

What is claimed is:

1. A lens system constructed as two groups of lenses located in front of and at the rear of an iris, respectively, the front group of lenses consisting of one of two lens systems: at least one positive meniscus lens component followed by a negative composite meniscus lens component; the convex surfaces of said lens components being turned toward the object side of the system, the rear group of lenses consisting of a negative meniscus single first lens component, a positive meniscus second lens component, a positive meniscus single third lens component and a positive single fourth lens component, the convex surfaces of said lens components of the rear group of lenses being turned toward the image side of the system, and which is defined by the following five conditions, i.e.

I.   $0.9f < f_p < 1.2f$,
II.  $0.35f < |f_B| < 0.75f, f_B < 0$,
III. $0.17f < |R_B| < 0.23f, R_B < 0$,
IV.  $|R_C| < |R_D|, R_C < 0, R_D < 0$, and
V.   $0.9(|R_A| + |R_B|)/2 < 1S < 1.4(|R_A|+|R_B|)/2$ where $f$ is a composite focal length of the total lens system, $f_p$ is a composite focal length of the front group of lens system, $f_B$ is a focal length of the first lens component of the rear group of lens system, $R_B$ is a radius of curvature of the lens surface of the first lens component facing the iris of the rear group of lens system, $R_C$ is a radius of curvature of the lens surface of the first lens component facing the image of the rear group of lens system, $R_D$ is a radius of curvature of the lens surface of the second lens component facing the iris of the rear group of lens system, $R_A$ is a radius of curvature of the lens surface of the lens facing the iris and which is the nearest to the iris of the front group of lens system, and $l_S$ is an air space between the front group of lens system and the rear group of lens system.

2. A lens system as claimed in claim 1, which is constructed as seven components and eight lenses and in which $f$ is 183 mm, $f_P$ is 198.73 mm, $f_B=-90.56$ mm the aperture ratio is F/4, the magnification is 1/20X, the dimension of the picture surface of the image is 100 $mm\phi$, an object is positioned at 3,625.0 mm from the front face of the lens system, an image is positioned at 60.5 mm from the rear face of the lens system, and $R_1$ to $R_{15}$, $d_1$ to $d_{14}$, $n_1$ to $n_8$ and $\nu_1$ to $\nu_8$ are defined by the following values,

| | | | |
|---|---|---|---|
| $R_1=103.48$ | | | |
| | $d_1=18.2$ | $n_1=1.69978$ | $\nu_1=55.62$ |
| $R_2=251.28$ | | | |
| | $d_2=0.8$ | | |
| $R_3=71.41$ | | | |
| | $d_3=18.2$ | $n_2=1.69978$ | $\nu_2=55.62$ |

| | | | |
|---|---|---|---|
| $R_4 = 121.60$ | | | |
| | $d_4 = 0.8$ | | |
| $R_5 = 82.29$ | | | |
| | $d_5 = 18.2$ | $n_3 = 1.69978$ | $\nu_3 = 55.62$ |
| $R_6 = 785.20$ | | | |
| | $d_6 = 7.5$ | $n_4 = 1.74618$ | $\nu_4 = 28.29$ |
| $R_7 = 39.39$ | | | |
| | $d_7 = 43.18$ | | |
| $R_8 = -38.48$ | | | |
| | $d_8 = 10.0$ | $n_5 = 1.80922$ | $\nu_5 = 39.57$ |
| $R_9 = -90.40$ | | | |
| | $d_9 = 0.8$ | | |
| $R_{10} = -265.79$ | | | |
| | $d_{10} = 20.0$ | $n_6 = 1.71615$ | $\nu_6 = 53.98$ |
| $R_{11} = -109.94$ | | | |
| | $d_{11} = 1.0$ | | |
| $R_{12} = -310.99$ | | | |
| | $d_{12} = 13.8$ | $n_7 = 1.71615$ | $\nu_7 = 53.98$ |
| $R_{13} = -104.46$ | | | |
| | $d_{13} = 1.0$ | | |
| $R_{14} = 386.94$ | | | |
| | $d_{14} = 13.8$ | $n_8 = 1.71615$ | $\nu_8 = 53.98$ |
| $R_{15} = -198.77$ | | | | where $n_1$ to $n_8$ are refractive indexes for the $e$-line and $\nu_1$ to $\nu_8$ are Abbe's numbers for the $d$-line.

3. A lens system as claimed in claim 1, which is constructed as six components and eight lenses and in which $f = 185$ mm, $f_P = 188.97$ mm, $f_B = -91.38$ mm the aperture ratio is F/4, the magnification is 1/20X, the dimension of the picture surface of the image is 100 mm$\phi$, an object is positioned at 3,760 mm from the front face of the lens system, an image is positioned at 66.0 mm from the rear face of the lens system, and $R_1$ to $R_{14}$, $d_1$ to $d_{13}$, $n_1$ to $n_8$ and $\nu_1$ to $\nu_8$ are defined by the following values,

| | | | |
|---|---|---|---|
| $R_1 = 120.32$ | | | |
| | $d_1 = 20.6$ | $n_1 = 1.69978$ | $\nu_1 = 55.62$ |
| $R_2 = -853.19$ | | | |
| | $d_2 = 5.2$ | $n_2 = 1.70443$ | $\nu_2 = 30.12$ |
| $R_3 = 408.41$ | | | |
| | $d_3 = 0.5$ | | |
| $R_4 = 53.88$ | | | |
| | $d_4 = 20.5$ | $n_3 = 1.71615$ | $\nu_3 = 53.98$ |
| $R_5 = 119.90$ | | | |
| | $d_5 = 10.3$ | $n_4 = 1.70443$ | $\nu_4 = 30.12$ |
| $R_6 = 39.60$ | | | |
| | $d_6 = 50.0$ | | |
| $R_7 = -36.75$ | | | |
| | $d_7 = 9.8$ | $n_5 = 1.75454$ | $\nu_5 = 35.19$ |
| $R_8 = -87.72$ | | | |
| | $d_8 = 0.5$ | | |
| $R_9 = -292.85$ | | | |
| | $d_9 = 14.0$ | $n_6 = 1.69675$ | $\nu_6 = 50.81$ |
| $R_{10} = -95.96$ | | | |
| | $d_{10} = 0.5$ | | |
| $R_{11} = -220.67$ | | | |
| $R_{12} = -97.82$ | | | |
| | $d_{11} = 14.0$ | $n_7 = 1.6966$ | $\nu_7 = 53.34$ |
| $R_{13} = \infty$ | | | |
| | $d_{12} = 0.5$ | | |
| $R_{14} = -185.15$ | | | |
| | $d_{13} = 14.0$ | $n_8 = 1.69978$ | $\nu_8 = 55.62$ | where $n_1$ to $n_8$ are refractive indexes for the $e$-line and $\nu_1$ to $\nu_8$ are Abbe's numbers for the $d$-line.

4. A lens system as claimed in claim 1, which is constructed as seven components and nine lenses and in which $f = 180$ mm, $f_P = 197.33$ mm, $f_B = -126.51$ mm the aperture ratio is F/4, the magnification is 1/20X, the dimension of the picture surface of the image is 100 mm$\phi$, an object is positioned at 3,621 mm from the front face of the lens system, an image is positioned at 68.6 mm from the rear face of the lens system, and $R_1$ to $R_{16}$, $d_1$ to $d_{15}$, $n_1$ to $n_9$ and $\nu_1$ to $\nu_9$ are defined by the following values,

| | | | |
|---|---|---|---|
| $R_1 = 102.05$ | | | |
| | $d_1 = 13.8$ | $n_1 = 1.71615$ | $\nu_1 = 53.98$ |
| $R_2 = 180.27$ | | | |
| | $d_2 = 0.7$ | | |
| $R_3 = 70.37$ | | | |
| | $d_3 = 14.6$ | $n_2 = 1.69978$ | $\nu_2 = 55.62$ |
| $R_4 = 140.85$ | | | |
| | $d_4 = 0.7$ | | |
| $R_5 = 70.34$ | | | |
| | $d_5 = 17.5$ | $n_3 = 1.6966$ | $\nu_3 = 53.34$ |
| $R_6 = 333.68$ | | | |
| | $d_6 = 8.0$ | $n_4 = 1.73429$ | $\nu_4 = 28.46$ |
| $R_7 = 36.28$ | | | |
| | $d_7 = 42.06$ | | |
| $R_8 = -38.79$ | | | |
| | $d_8 = 11.2$ | $n_5 = 1.74795$ | $\nu_5 = 44.78$ |
| $R_9 = -73.86$ | | | |
| | $d_9 = 0.7$ | | |
| $R_{10} = -181.15$ | | | |
| | $d_{10} = 6.8$ | $n_6 = 1.74795$ | $\nu_6 = 44.78$ |
| $R_{11} = 159.36$ | | | |
| | $d_{11} = 16.5$ | $n_7 = 1.6254$ | $\nu_7 = 57.06$ |
| $R_{12} = -129.29$ | | | |
| | $d_{12} = 0.7$ | | |
| $R_{13} = \infty$ | | | |
| | $d_{13} = 10.00$ | $n_8 = 1.71615$ | $\nu_8 = 53.98$ |
| $R_{14} = -142.28$ | | | |
| | $d_{14} = 0.7$ | | |
| $R_{15} = \infty$ | | | |
| | $d_{15} = 13.5$ | $n_9 = 1.71615$ | $\nu_9 = 53.98$ |
| $R_{16} = -124.67$ | | | | where $n_1$ to $n_9$ are refractive indexes for the $e$-line and $\nu_1$ to $\nu_9$ are Abbe's numbers for the $d$-line.

* * * * *